April 23, 1963

C. J. IBEX 3,086,484

CONTAINER FORMING MOLDS

Filed Dec. 5, 1960

INVENTOR.
CHARLES J. IBEX
BY
*Albert J. Kramer*
ATTORNEY

April 23, 1963
C. J. IBEX
3,086,484
CONTAINER FORMING MOLDS
Filed Dec. 5, 1960
3 Sheets-Sheet 2
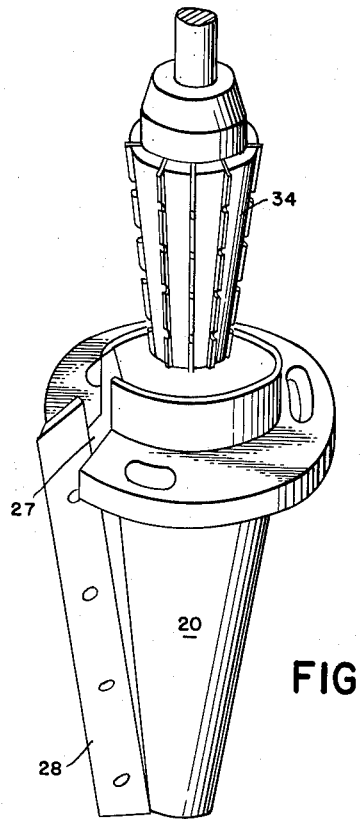
FIG. 3.
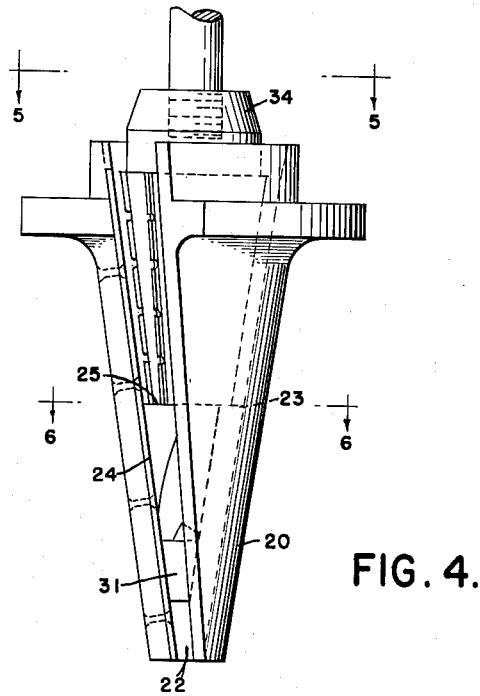
FIG. 4.
FIG. 7.
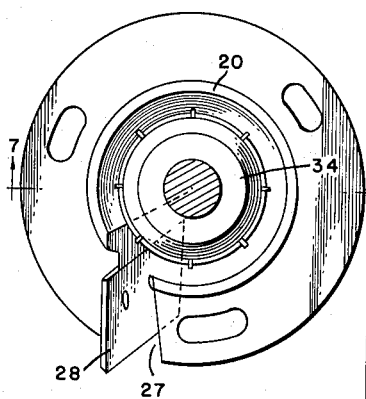
FIG. 5.
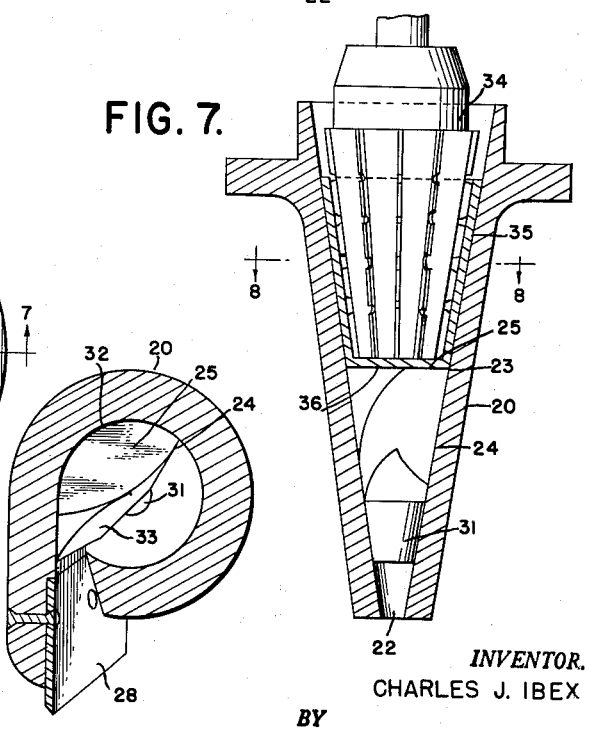
FIG. 6.
INVENTOR.
CHARLES J. IBEX
BY
Albert J. Kramer
ATTORNEY April 23, 1963

C. J. IBEX 3,086,484

CONTAINER FORMING MOLDS

Filed Dec. 5, 1960

INVENTOR.
CHARLES J. IBEX
BY
Albert J. Kramer
ATTORNEY ns Patent Office 3,086,484
Patented Apr. 23, 1963

3,086,484
CONTAINER FORMING MOLDS
Charles J. Ibex, Baltimore, Md., assignor to The Maryland Baking Co., Baltimore, Md., a corporation of Maryland
Filed Dec. 5, 1960, Ser. No. 73,633
2 Claims. (Cl. 107—8)

This invention relates to edible pastry containers, such as those conventionally used for holding frozen confections, including ice cream, sherberts, etc., and it is more particularly concerned with the manufacture of such containers in the form of a frusto-conical shell with a flat bottom.

An object of this invention is the provision of a hollow mold for receiving on its interior a baked thermoplastic wafer from an exterior source and a cooperating spinner on the interior of the mold for grasping the wafer and spinning it within the mold to form the desired flat-bottomed container.

The use of thermoplastic wafers to form edible pastry containers has, heretofore, been limited to the conical form of container, while the flat-bottomed containers have been manufactured by the use of a thin batter poured into molds and heated until the batter is baked and becomes rigid to the form of the mold.

The present invention, therefore, comprises a departure from the prior art in making it possible to manufacture flat-bottomed edible containers by the use of thermoplastic wafers.

Another object of the invention is the modification of a conventional type of mold and cooperating spinner used to manufacture conical containers in such a way as to render it capable of manufacturing a flat-bottomed container.

Other objects of the invention will appear more fully from the following description considered together with the accompanying drawings.

In the drawings:

FIG. 3 is a perspective view of the hollow mold and cooperating spinner elevated thereabove, in non-operating position, in accordance with one embodiment of the invention, removed from the machine as a whole.

FIG. 4 is a separate elevational view of the hollow mold and spinner in operative position looking into the mold through the wafer inlet slot.

FIG. 5 is a top plan view, partly in section, along the line 5—5 of FIG. 4.

FIG. 6 is a cross-sectional view along the line 6—6 of FIG. 4.

FIG. 7 is a vertical sectional view along the line 7—7 of FIG. 5 just after the formation of a pastry cup therein before its removal from the mold.

Figure 1:
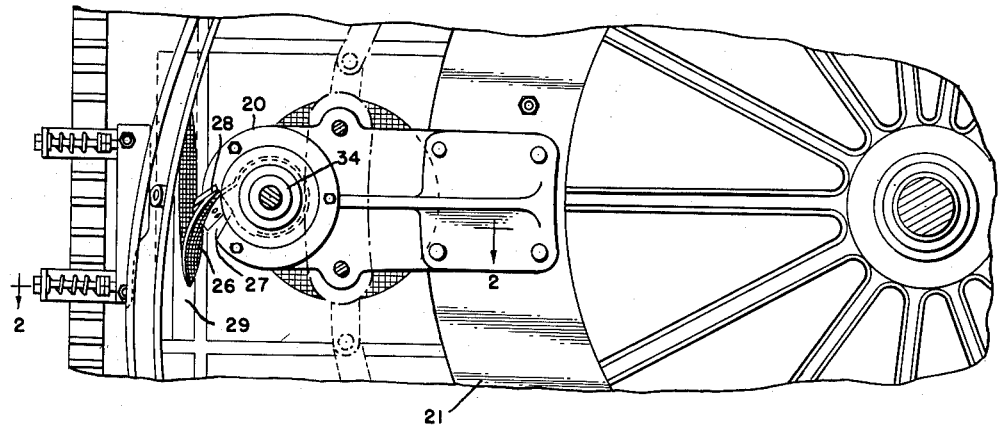
FIG. 1 is a fragmentary plan view of a conventional machine used to manufacture so called "sugar cones" and containing the modifications pertinent to this invention.
Figure 2:
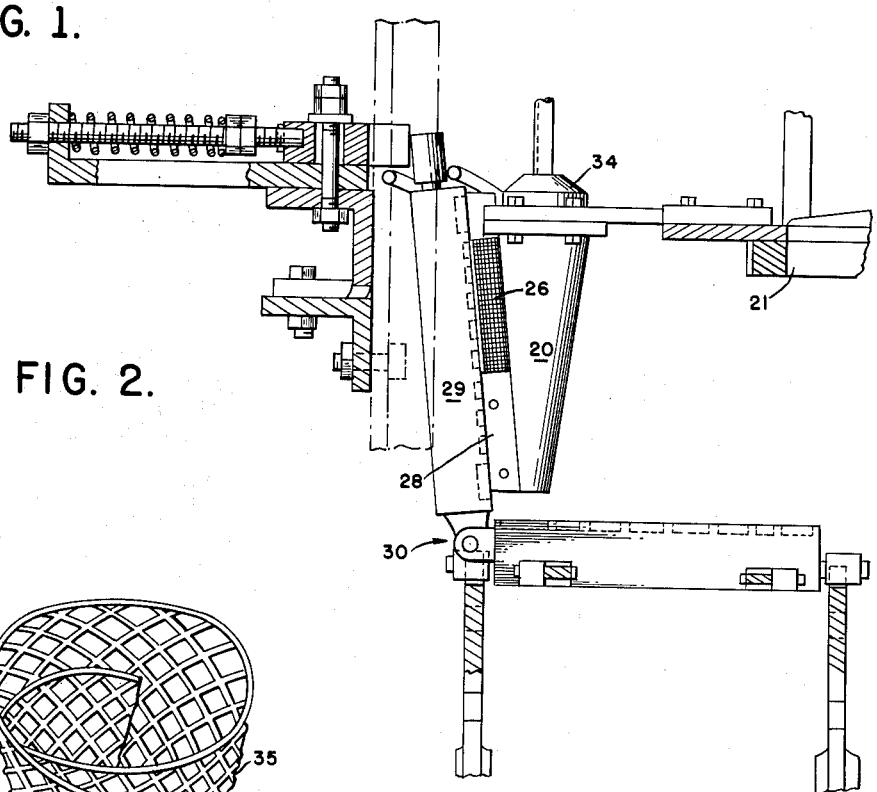
FIG. 2 is a vertical sectional view generally along the line 2—2 of FIG. 1 on an enlarged scale.
Figure 13:
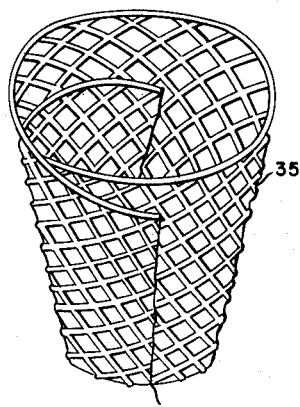
FIG. 13 is a perspective view of the product resulting from the use of the invention.
Figure 8:
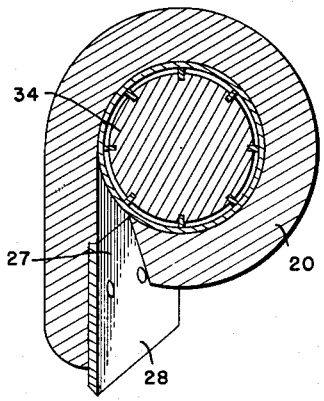
FIG. 8 is a section along the line 8—8 of FIG. 7.

Referring with more particularity to FIGS. 1 to 8 of the drawings the embodiment illustrated comprises a hollow conical mold 20 conventionally mounted on a rotating wheel 21 of a conventional "sugar cone" machine. Between the apex 22 and the point 23 above it where the cross-sectional area of the mold is equal to the area of the base of the container to be formed, a conical segment 24 is securely disposed such as by welding or by being made integral with the mold. A flat surface 25 at the top of the segment is substantially less than the said cross-sectional area to permit the entrance into the mold of the bottom part of a wafer 26 through the conventional slot 27 of the mold. A scraper blade 28 is attached to one side of this slot to engage wafers on the upper grids 29 of a baking unit 30 forming a part of the sugar cone machine as a whole.

The segment 24 tapers from the surface 25 to a frusto-conical bottom seating part 31 forming in addition to the arcuate portion 32 that lies against the inner surface of the mold, a surface 33 adjacent the slot 27 which is disposed at an acute angle to the blade 28 and hence encounters the bottom part of the wafer as it enters the interior of the mold and guides it along its surface.

As a wafer 26 enters the mold, its upper part is contacted by the spinner 34 which, instead of the conventional conical shape, is frusto-conical. The wafer in its thermoplastic or hot pliable state is thus spun around in the mold by the spinner a number of times by conventional means, not shown herein, to form the desired pastry cup 35 with flat bottom 36, whereupon the spinner is elevated from the mold and the formed cup stripped from the spinner at a discharge station, all as conventionally known to the art. The flat bottom 36 is formed by contact of the lower part of the wafer with the flat surface 25 of the segment 24.

The various conventional means referred to herein are shown in U.S. Patent No. 2,745,363.

Figure 9:
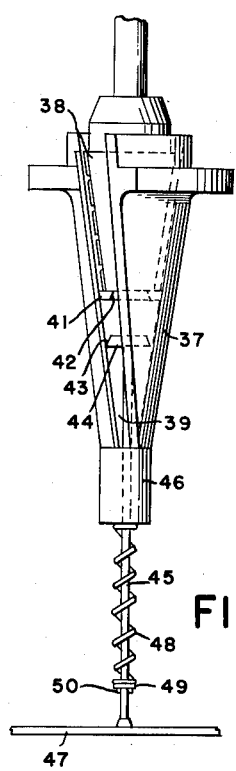
FIG. 9 is a view similar to FIG. 4 of a modified embodiment of the invention.
Figure 10:
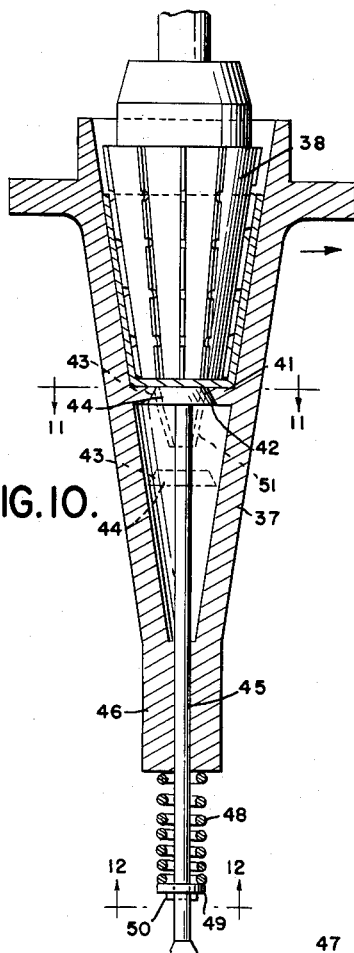
FIG. 10 is a vertical sectional view of the modified embodiment.
Figure 12:
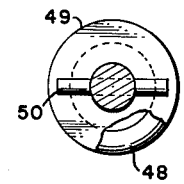
FIG. 12 is a section along the line 12—12 of FIG. 10.
Figure 11:
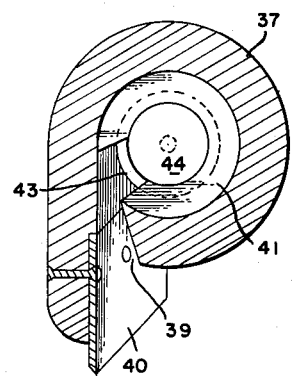
FIG. 11 is a section along the line 11—11 of FIG. 10.

The embodiment illustrated in FIGS. 9 to 12 comprises a similar hollow conical mold 37 and a frusto-conical spinner 38. The mold is likewise provided with a wafer inlet slot 39 and scraper blade 40. The inner wall of the mold comprises a ledge 41 extending around the wall from one side of the slot 39 to the other where the bottom wall of the container is to be formed.

The inner edge of the ledge 41 is undercut to provide a downwardly facing bevel edge 42 which registers with the upwardly facing bevel edge 43 of a vertically movable plate 44.

The plate 44 is secured to the upper end of a stem or rod 45 which is slidably engaged with a bearing 46 formed in the bottom of the mold. The lower end of the rod slidably engages a stationary cam track 47 by means of which it is moved to its upper positon when the mold moves relative to the track.

A return spring 48 is disposed about the stem 45 between the bottom of the mold and a retainer 49 held by a pin 50 at the bottom of the stem.

The parts are proportioned so that the diameter of the plate 44 results in its lowermost position being just below the wafer as the wafer enters the mold through the slot 39. As the wafer thus enters the mold, a central conical tail portion 51 results from the bottom part of the wafer lying below the ledge 41 and over the plate 44. The plate then moves up to flatten this tail portion against the bottom of the spinner 38 and thus forms a continuous bottom with the ledge for completing the formation of the bottom of the cup. The formed cup is then removed from the mold by conventional means, as explained above in connection with the first embodiment, and the plate 44, moving past the cam track 47 is returned to its initial position by the spring 48.

I claim:

1. In a machine for manufacturing pastry containers having a hollow conical mold member, said mold member having an inlet slot for wafers to be formed into containers, a cooperating spinner to engage such wafers entering the slot to rotate them against the mold walls, said spinner having a frusto-conical form, and a conical segment within the mold adjacent the inlet slot between the apex of the mold and the lowermost position of the spinner in the mold.

2. A hollow conical mold for forming a flat-bottomed cup from a pliable sheet, said mold having a longitudinal inlet slot for passage of the sheet from the exterior to the interior of the mold, a conical segment within the mold adjacent the slot between the apex of the mold and the position therein wherein the bottom of the container is to be formed, said segment having a flat top extending substantially midway from one side of the mold to the other.

References Cited in the file of this patent

UNITED STATES PATENTS

| | | |
|---|---|---|
| 2,004,530 | Howe et al. | June 11, 1935 |
| 2,508,724 | Moffett | May 23, 1950 |
| 2,624,296 | Nuttall | Jan. 6, 1953 |
| 2,656,798 | Miller | Oct. 27, 1953 |
| 2,745,363 | Balton | May 15, 1956 |
| 2,774,315 | Heyman | Dec. 18, 1956 |